(12) United States Patent
Brown et al.

(10) Patent No.: US 12,389,209 B2
(45) Date of Patent: Aug. 12, 2025

(54) REMOTE IDENTIFICATION SYSTEM FOR THE REMOTE IDENTIFICATION OF AN OBJECT

(71) Applicant: RELMATECH LIMITED, Eastleigh (GB)

(72) Inventors: Simon Brown, Eastleigh (GB); Philip Hall, Eastleigh (GB); Owen Bridle, Eastleigh (GB)

(73) Assignee: RELMATECH LIMITED, Eastleigh (GB)

( * ) Notice: Subject to any disclaimer, the term of this patent is extended or adjusted under 35 U.S.C. 154(b) by 0 days.

(21) Appl. No.: 18/587,205

(22) Filed: Feb. 26, 2024

(65) Prior Publication Data

US 2024/0196174 A1    Jun. 13, 2024

Related U.S. Application Data

(63) Continuation of application No. 16/645,173, filed as application No. PCT/GB2018/052519 on Sep. 6, 2018, now Pat. No. 11,917,504.

(51) Int. Cl.
| | |
|---|---|
| *H04W 4/20* | (2018.01) |
| *G06F 3/14* | (2006.01) |
| *H04W 4/06* | (2009.01) |
| *B64U 10/13* | (2023.01) |
| *B64U 101/20* | (2023.01) |
| *H04W 4/80* | (2018.01) |
| *H04W 84/12* | (2009.01) |

(52) U.S. Cl.
CPC .............. *H04W 4/20* (2013.01); *G06F 3/14* (2013.01); *H04W 4/06* (2013.01); *B64U 10/13* (2023.01); *B64U 2101/20* (2023.01); *H04W 4/80* (2018.02); *H04W 84/12* (2013.01)

(58) Field of Classification Search
None
See application file for complete search history.

(56) References Cited

U.S. PATENT DOCUMENTS

| | | |
|---|---|---|
| 2012/0057646 A1 | 3/2012 | Jovicic et al. |
| 2015/0050906 A1 | 2/2015 | Yuasa |
| 2015/0254986 A1 | 9/2015 | Fairfield et al. |
| 2017/0075740 A1 | 3/2017 | Breaux et al. |
| 2017/0092109 A1 | 3/2017 | Trundle et al. |
| 2018/0025044 A1* | 1/2018 | Hostetter ............. G08G 5/0082 707/690 |
| 2018/0168464 A1 | 6/2018 | Barnett et al. |
| 2018/0316603 A1 | 11/2018 | Boucadair et al. |
| 2018/0373304 A1 | 12/2018 | Davis et al. |
| 2019/0172357 A1 | 6/2019 | Meuleman et al. |

FOREIGN PATENT DOCUMENTS

EP    2763376 A2    8/2014

* cited by examiner

*Primary Examiner* — Suhail Khan
(74) *Attorney, Agent, or Firm* — Saul Ewing LLP

(57) ABSTRACT

A remote identification system for the remote identification of an object that includes a wireless transmitter configured to broadcast a static identifier, such as a WiFi SSID. The object also includes a local broadcast module that dynamically alters or re-purposes the identifier so that it is no longer a static identifier but instead includes broadcast data that varies depending on the status of the object, such as its location.

21 Claims, 2 Drawing Sheets

REMOTE IDENTIFICATION SYSTEM FOR THE REMOTE IDENTIFICATION OF AN OBJECT

CROSS REFERENCE TO RELATED APPLICATIONS

This application is a continuation of U.S. application Ser. No. 16/645,173, filed on Mar. 6, 2020, which claims the priority of PCT/GB2018/052519, filed on Sep. 6, 2018, which claims priority to GB Application No. GB1714354.6, filed on Sep. 6, 2017, the entire contents of each of which being fully incorporated herein by reference.

BACKGROUND OF THE INVENTION

1. Field of the Invention

The field of the invention is the remote identification of objects, such as drones and IoT devices.

2. Discussion of Related Art

With the proliferation of internet-connected devices, and smart remotely-operating devices, the identification, location, and status of such devices is important, and increasingly difficult to determine.

While networked solutions may exist to allow cloud connection of devices (especially IOT devices), this is not always possible, especially if there is no network coverage or connection available.

In this instance a method of local device identification and information retrieval (e.g. position, status of operation, sensor data etc) is required.

This document sets out a method that makes this possible.

SUMMARY OF THE INVENTION

A first aspect is a system for the remote identification of an object, the object including a wireless transmitter configured to broadcast a static identifier;

in which the object also includes a local broadcast module that dynamically alters or re-purposes the identifier so that it is no longer a static identifier but instead includes broadcast data that varies depending on the status of the object.

Optional features relating to the broadcast data include the following:

The broadcast data is not used for network attachment but instead to provide data about the object and/or data acquired by the object.

The local broadcast module dynamically alters the identifier in real-time as the status changes.

The local broadcast module also dynamically alters or re-purposes other frames to include data that varies depending on the status of the object and includes these frames in the broadcast data.

The broadcast data includes a flag or header to indicate that the data is no longer exclusively a conventional, static identifier.

The broadcast data includes location data.

The broadcast data includes operational status data.

The broadcast data includes a fault code.

The broadcast data includes sensor data.

The broadcast data includes data generated by a payload in the object, and the object status changes when a payload is present or alters.

The broadcast data includes data required to determine if the object is operating lawfully.

The broadcast data includes data that does not vary depending on the status of the object, such as identity data.

The broadcast data also includes a conventional, static identifier.

The static identifier is or includes a network name, or device identifier, or MAC address.

The broadcast data includes data targeted at a specific device.

The local broadcast module includes or communicates with a location receiver in the object, such as a GPS receiver Optional features relating to the different RF types include one or more of the following:

The wireless transmitter is a 802.11 or WiFi transmitter and the local broadcast module alters or re-purposes the SSID identifier The wireless transmitter is a 802.11 WiFi transmitter and the local broadcast module alters or re-purposes the SSID identifier and also the BSSID The wireless transmitter is a WiFi transmitter and the local broadcast module alters or re-purposes the SSID identifier, the BSSID and also the Vendor Specific Information The first characters in the SSID are used as a flag or header; a second set of characters in the SSID are used for latitude and longitude data; and a third set of characters in the SSID are used for altitude data.

Course, heading and speed are added to the Vendor Specific Information

Vendor Specific Information includes the BSSID of a specific recipient, if the data is meant just for that specific recipient.

The wireless transmitter is a Bluetooth transmitter and the identifier is the device name The wireless transmitter is a Bluetooth Eddystone transmitter and the identifier is the URL or TLM data packet format The wireless transmitter is a Bluetooth low energy beacon transmitter and the identifier is the device name The wireless transmitter is a LORA transmitter and the identifier is included in the management frames The wireless transmitter is a Sigfox transmitter and the identifier is included in the management frames The wireless transmitter is a ZWave transmitter and the identifier is included in the management frames The wireless transmitter is a RF transmitter and the identifier is custom-designed with header and data packets Optional features relating to the receiver include one or more of the following:

The system includes a receiver that searches for available wireless connections broadcast from an object and an appropriate header or flag that indicates that data that is normally a conventional, static identifier is being re-purposed to include data that varies depending on the status of the object.

The receiver includes an augmented reality subsystem that displays some or all of the broadcast data that varies depending on the status of the object.

The augmented reality subsystem displays some or all of this broadcast data in proximity to an image of the object A second aspect of the invention is an object including a wireless transmitter configured to broadcast a static identifier;

in which the object includes a local broadcast module that dynamically alters or re-purposes the identifier so that it is no longer a conventional, static identifier but instead includes broadcast data that varies depending on the status of the object.

Optional features relating to the object itself include one or more of the following:

The object is an unmanned aerial vehicle
The object is an autonomous vehicle
The object is a road vehicle, such as a car, truck or bike
The object is an IoT device
The object is a smartphone
The object is a smartwatch
The object is a person or other type of animal.

A final aspect is a remote identification method for the remote identification of an object, the object including a wireless transmitter configured to broadcast a static identifier; in which the object also includes a local broadcast module;

in which the method comprises the step of the local broadcast module dynamically altering or re-purposing the identifier so that it is no longer a static identifier but instead includes broadcast data that varies depending on the status of the object.

DETAILED DESCRIPTION

1. Overview

Figure 1:
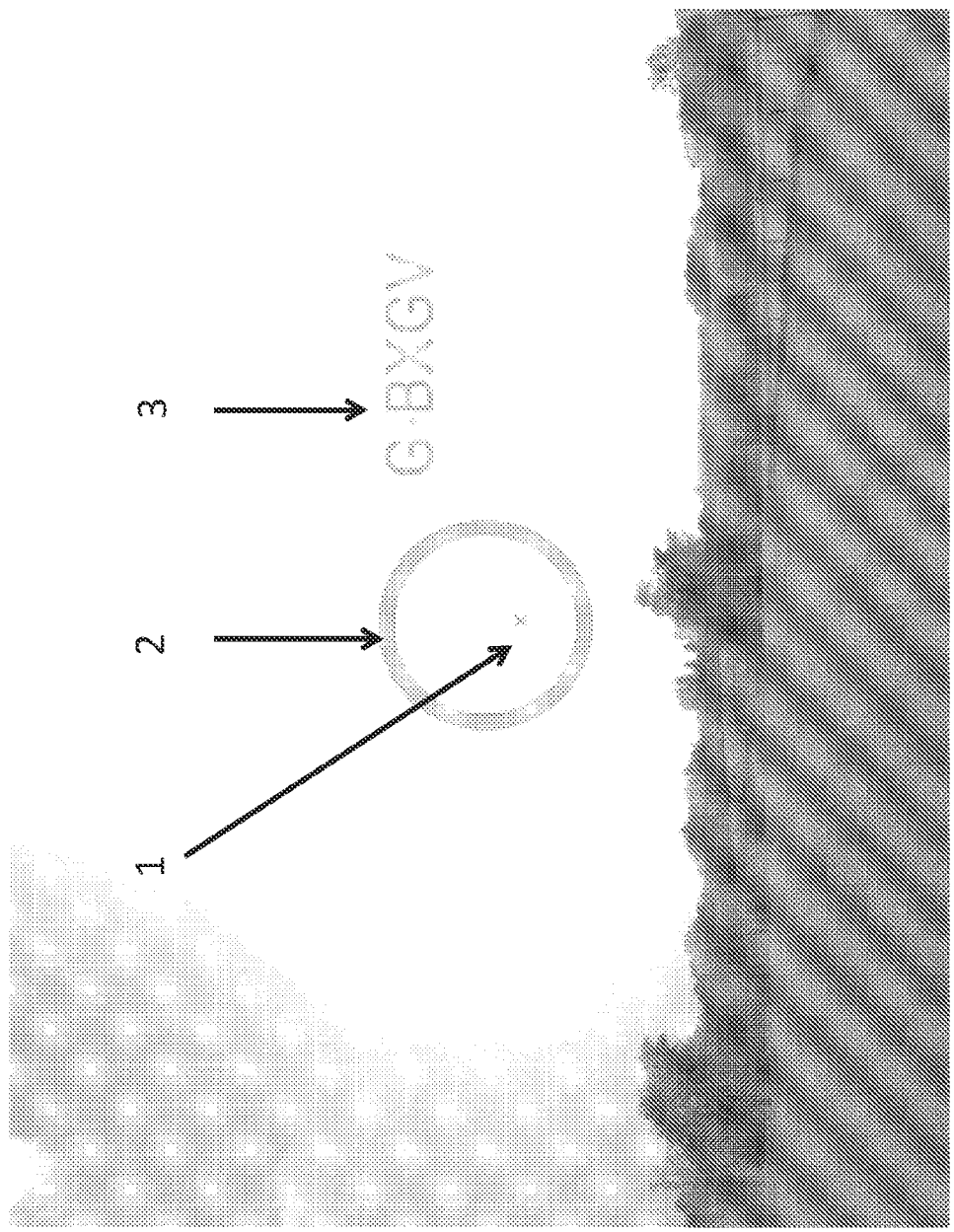
FIG. 1 shows how an augmented reality application can take the UAV identification data and super-impose it on a display that shows the UAV.

The following outlines the principle of operation of an implementation of the invention, specifically a Local Broadcast System for the identification and broadcast of device-specific data. The initial application devised by Relmatech is aimed at Unmanned Aerial Vehicles (UAVs), but the invention is applicable to IOT devices in general, with any type of data that needs to be quickly and efficiently communicated. For simplicity the descriptions below are based on the UAV application, but the implementation may be adapted for any IOT device.

There are two main elements to the system: the device broadcast module and a receiver.

1.1 Local Broadcast Module (LBM)

The device or aircraft (for UAV applications) to be identified is fitted with a Local Broadcast Module (LBM). The LBM incorporates an RF transmitter, which may be WiFi, Bluetooth, LORA, Sigfox, ZWave, or other standard RF transmitter. For sake of simplicity the document describes the WiFi implementation, but once again the implementation can be modified for most RF technologies.

The principle of operation is that the LBM dynamically changes the broadcast identifier of the RF unit to convey data, which may include identity, location, sensor and payload data. For example for WiFi the broadcast identifier is the SSID and associated management frames with custom data. For Bluetooth the broadcast identifier is the device name or, using Bluetooth Eddystone, the URL or TLM data packet format.

The LBM can also be configured to broadcast data targeted at a specific device. The beacon signal can be augmented to include data intended for an individual receiver.

In this solution, the LBM identifier (e.g. SSID in the case of WiFi) is dynamically modified to convey specific data:

A header which flags that the broadcast SSID represents device data (e.g. "#R")
Device-specific payload data.
Unique Device Identifier (UDI) is carried by the BSSID The device-specific data may be location data, sensor data, device status data (battery status, connectivity etc), or any other payload data such as stored images etc.

In operation, the LBM gathers data from the device to which it is attached, dynamically changes its identifier (e.g. SSID in the case of WiFi) and then broadcasts the updated identifier containing header, the UDI, and the payload data. This data stream may be encrypted for security reasons.

The LBM may have an integrated GPS receiver to provide accurate location data independent of the device it is attached to. Location data can also be obtained by other methods such as triangulation of received RF signals (e.g. from received WiFi SSIDs).

Ideally the frequency used for operation by the LBM should be an open frequency so that no license is required to enable the broadcast of the message to take place openly and easily. For the receiver, any handheld device (e.g. a mobile phone with the correct radio receiver, a laptop etc) can then be used to listen for the transmitted messages.

The range of detection of the LBM can vary from metres to kilometres depending on RF option selected.

1.2 Receiver

To make use of the local broadcast data a receiver is needed. The receiver can be a purpose-built device (e.g. another LBM, a smartphone with an app, a laptop, server or other computing device.

The receiver monitors the appropriate RF frequencies, searching for available RF connections as signified by their broadcast identifiers (e.g. WiFi devices searche for available SSIDs). Once an SSID is detected, it is checked for the appropriate header (e.g. "#R"). On confirming an appropriate header the receiver then deconstructs the data signal into header, and payload data, noting the UDI where relevant.

Note that no network attachment to the LBM is needed, and no connection to an external network is needed to identify the LBM and device. As a result, latency of communication is very low.

Augmented reality apps may be used to aid the identification process. In this use case, the user would hold up a smart phone or tablet with a camera highlighting the device in question. The app would then show the decoded data from the device (i.e. identifier and any payload data). FIG. 1 shows a screen shot of this in practice, with the device 1 highlighted by a circle 2 generated by the augmented reality application; the application also displays a unique identifier 3 for the device, in this case the identifier G-BXGV.

Figure 2:
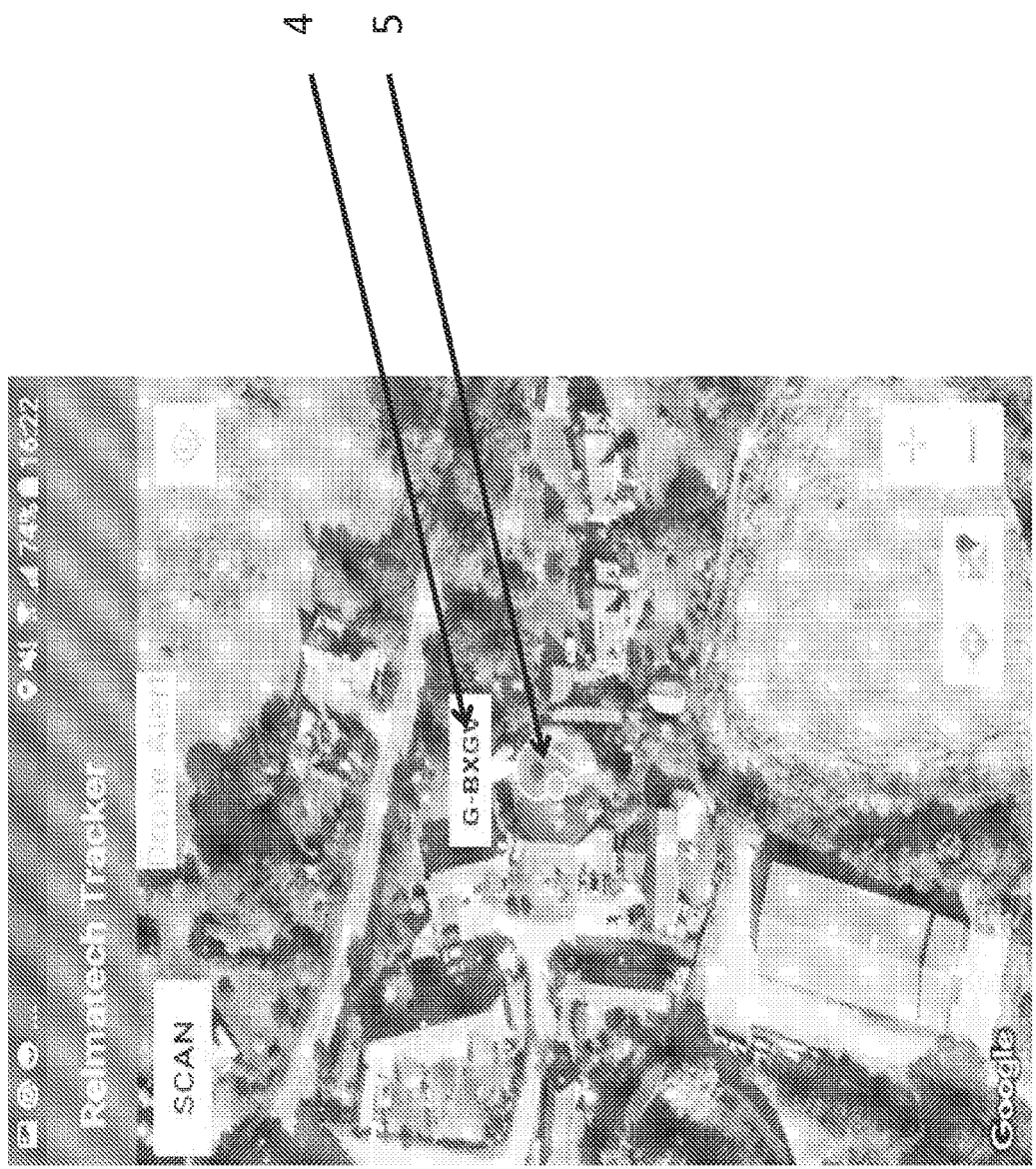
FIG. 2 shows how a tracking application can take the UAV location and identification data and drop a marker pin on a map at the UAV's current location, together with that identification data.

FIG. 2 shows how the location of the device can be plotted directly onto a digital map, such as Google Maps. Here, the dynamic location data is extracted from the broadcast data sent by the LBM and is used to automatically position a marker 5 for the device's current location over a digital map. The identifier 4 (G-BXGV) is also associated with the marker 5 on the digital map. As the device moves across the map, the marker will move correspondingly.

Receivers of any type (e.g. specific device, smartphone, computing device) may also be used to re-transmit received signals, thereby extending the range of communications of any individual device, or to create a mesh network.

2.1 LBM Beacon Broadcast on WiFi

The implementation of the LBM on WiFi technology utilises the 802.11 standard for WiFi, and uses a combination of SSID and control frames to broadcast data. It should be noted that the system exploits the 802.11 standard for the purposes of data broadcast, not to create network attachment. The approach is as follows for a UAV.

An 802.11 standard WiFi broadcast identifier contains the SSID, but also includes BSSID (unique device identifier, 6 byte character stream, by default the device MAC address) and Vendor Specific Information (available data bits which may be used by the vendor for device configuration for example). While the SSID is visible to most devices, the BSSID and Vendor Specific Information is not. The Relmatech Local Broadcast Solution utilises all these data fields, dynamically.

2.1.1. Beacon Broadcast

1. The LBM broadcasts a WiFi SSID which has been dynamically constructed as follows:
    a. First characters in SSID—header characters that flag the SSID as belonging to a device emitting a beacon: "#R"
    b. Second set of characters in SSID—latitude and longitude location data
    c. Third set of characters in SSID—altitude data
2. The broadcast module identifier as standard includes the BSSID, also the proxy for the aircraft identifier, and Vendor Specific Information (in the Vendor Specific Information in a standard Relmatech broadcast the course, heading and speed of the device are added).
3. As a default, the LBM broadcasts its ID and position every 100 msec using the standard broadcast SSID (which includes BSSID and control data, usually hidden to most devices) as a beacon.
4. Note that no network attachment is required—a receiver only has to decode the SSID data.

The structure of the SSID beacon signal is:
RAAAAABBBBBBCCCC where:
   #R indicates the SSID data which follows is beacon data
   AAAAA is the latitude of the device
   BBBBBB is the longitude of the aircraft
   CCCC is the altitude of the device
   NB: altitude is the GNSS altitude, approximately altitude above mean sea-level, AMSL. A 3D-lock is required before latitude, longitude and altitude are broadcast.

In addition to the SSID, the BSSID is broadcast, and also a data set known as Vendor Specific Information. Relmatech uses the Vendor Specific Information to broadcast the course, heading and Speed of the device as standard.

Where increased positional accuracy is required (e.g. for Collision Detect and Avoid—DAA applications), Relmatech adds further positional data to the Vendor Specific Information as part of the broadcast to increase accuracy.

2.1.2 V2V Broadcast

V2V broadcasts are interleaved between standard beacon broadcasts (default refresh rate is 100 ms) and exploit the BSSID and Vendor Specific Information in the WiFi standard. Total bytes available using this approach per transmission is 200 bytes.

The BSSID is the default identifier of the device, and is broadcast with the SSID. Higher order applications can correlate this BSSID data with the actual call sign of the aircraft, but for applications like Collision Detection and Avoidance (DAA) utilising the BSSID alone is adequate.

Vendor Specific Information is used to communicate a message either in broadcast to all aircraft (e.g. position as part of the standard beacon broadcast), or to a specific aircraft with a specific data set.

To broadcast to a specific device, the LBM includes in the header of the Vendor Specific Information the BSSID of the intended recipient device. In decoding the data stream, the recipient device sees its BSSID in the Vendor Specific Data and knows the message that follows is for it to process.

Where another device has been detected by the LBM, the calculated bearing and course of the detected aircraft in relation to the LBM is passed to a higher order application for reporting (See Annex A: AT command set).

3. Example Use Cases

3.1 Unmanned Aircraft Vehicles (UAVs).

A UAV fitted with an LBM broadcasts its UDI and location (latitude, longitude, altitude). A law enforcement officer can then refer to a smart phone equipped with an app. The camera on the phone shows the drone, and the app (via augmented reality) shows the unique identifier of the drone (e.g. Nxxxxx registration number). The augmented reality app has utilised the identity and position data being broadcast by the LBM from the UAV, compared that with its own position and orientation, and then been able to highlight on the display the identity of the UAV.

3.2 Remote Research Sensor

A researcher in the field has a number of sensors distributed around an area. The researcher can then refer to a tablet to locate a sensor and to log the identity and data from the device via an app.

3.3 Factory Production Equipment

A factory production line flags a fault. The technician goes to the production line and refers to an app on a smartphone or tablet. The LBMs provide their identity, and the LBM attached to the faulty device broadcasts a fault code for fast identification and repair/replacement. The technician can use augmented reality to locate the faulty part and replace it.

3.4 Consumer Products

A household refrigerator is faulty. The repair technician refers to a tablet which identifies the faulty unit and broadcasts a fault code.

ANNEX A

At Command Set

1. AT Interface Synopsis

Interface Settings

Between Customer Application and the Module, standardized RS-232 interface is used for the communication, and default values for the interface settings as following:
   115200 bps, 8-bit data, no parity, 1 bit stop, no data stream control.

AT Command Syntax

The prefix "AT" or "at" (no case sensitive) must be included at the beginning of each command line and the character <CR> is used to finish a command line so as to issue the command line to the Module. It is recommended that a command line only includes a single command.

When Customer Application issues a series of AT commands on separate command lines, it is required that the customer application leaves a pause between the preceding and the following command allowing the modem to responses and send validation to the Customer Application, for example, "OK" has been transmitted.

The format of Basic Command is "AT+<x>; <n>; <a>", "<x>" is the command name, and "<n> and <A>" is/are the parameter(s) for the relevant commands.

Information Responses

If the commands included in the command line are supported by the Module and the sub parameters are correct as presented, information responses will be retrieved by from the Module. Otherwise, the Module will report "#R; Invalid request; ok" to the Customer Application.

Information responses start with a message type identifier see Message Type i.e. the format of information responses is "<Message Type>; <response>; ok<CR>". Inside information responses, there may be one or more ";" to separate the values sent.

Message Types

L=Local GPS/GNSS update

B=Received broadcast

M=Message received

R=Response to AT command issued

2. Default Message Setup

On powering up the Relmatech module and connection is made to a configured USB port the customer application will see the following message every 200 ms.

L; Waiting for 3D GPS lock

Once GPS lock has been achieved and there are enough satellites to be able to calculate altitude, the module will start to send the user application local location information in the following format:

L; lat; lng; alt; heading; speed; time stamp

Lat: Latitude

Lng: Longitude

Alt: Meters

Heading: Degrees

Speed: kmh

Time: Local time from the GPS reciever

Example of real data—

L; 52.2476; −0.1569; 167; 104.25; 0.17; 09:04:46

These local messages will flow every 200 ms until the module is powered down (in future the timer will be updatable via the AT commands).

When the module sees a valid broadcast from another module, the customer application will receive the following message:

B; address; lat, lng; alt; Heading; Speed; Distance to object; Bearing to object These messages will be forwarded to the customer application every time they are received by the Relmatech module.

Example of real data—

B; 5CCF7FEEA96B; 52.2476; −0.1569; 65; 137.9; 0.1; 5811; 179.80

5CCF7FEEA96B: Remote module address 52.2476: Latitude

−0.1569: Longitude

65: Alt in Meters 137.9: Direction 0.1: Speed in kmh

5811: Distance to object in km 179.80: Bearing to object in Degrees

3. AT Commands

| Command | Response |
|---|---|
| At\n | #R;ok\n |
| at+gmac\n | #R;address of this device;ok\n |
| at+gchan\n | #R;WiFi channel address we are using;ok\n |
| at+smsg; 5CCF7FEEA96B; Hello\n | #R;Sent;ok\n |

The invention claimed is:

1. A remote identification system for the remote identification of an unmanned aerial vehicle (UAV), the remote identification system including the UAV,
wherein the UAV includes a local broadcast device, the local broadcast device including a wireless transmitter configured to broadcast a static identifier, and in which the local broadcast device is configured to (i) broadcast data and (ii) to dynamically alter or re-purpose frames of the static identifier so that it is no longer a static identifier but instead includes data that varies depending on a status of the UAV; and (iii) to include these frames in the broadcast data;
the local broadcast device further including a receiver configured to scan for available wireless connections broadcast by other UAVs equipped with similar local broadcast devices, thereby establishing a wireless mesh network among the UAVs.

2. The remote identification system of claim 1, in which the receiver is configured to scan for available wireless connections broadcast from one or more of the other UAVs.

3. The remote identification system of claim 1, in which the receiver is configured to scan for an appropriate header or flag that indicates that the broadcast data broadcasted by one or more of the other UAVs is normally a conventional, static identifier that is being re-purposed to include data that varies depending on the status of the one or more of the other UAVs.

4. The remote identification system of claim 1, in which the receiver includes an augmented reality subsystem that displays some or all of the broadcast data that varies depending on the status of the one or more UAVs.

5. The remote identification system of claim 4, in which the augmented reality subsystem displays some or all of this broadcast data in proximity to an image of the UAV.

6. The remote identification system of claim 1, in which the broadcast data is not used for network attachment but instead to provide data about the UAV and/or data acquired by the UAV.

7. The remote identification system of claim 1, in which the local broadcast device dynamically alters the frames of the static identifier in real-time as the status of the UAV continuously changes.

8. The remote identification system of claim 1, in which the broadcast data includes data targeted at a specific intended device or other UAV.

9. The remote identification system of claim 8, in which the broadcast data includes a unique ID that is associated with a specific intended device or other UAV, if the broadcast data is meant just for that specific intended device or other UAV.

10. The remote identification system of claim 1, in which the broadcast data includes data related to includes a BSSID of a specific intended device or other UAV, if the data is meant just for that specific intended device or other UAV.

11. The remote identification system of claim 1, in which the static identifier is a Service Set Identifier (SSID) such that the local broadcast device alters or re-purposes the SSID.

12. The remote identification system of claim 1, in which the static identifier is a Service Set Identifier (SSID) and a Basic Service Set Identifier (BSSID) such that the local broadcast device alters or re-purposes the SSID and the BSSID.

13. The remote identification system of claim 1, in which the static identifier is a Service Set Identifier (SSID), a Basic Service Set Identifier (BSSID) and a Vendor Specific Information such that the local broadcast device alters or re-purposes the SSID, the BSSID and the Vendor Specific Information.

14. The remote identification system of claim 1, in which the broadcast data includes a flag or header to indicate that the broadcast data is no longer exclusively a conventional, static identifier.

15. The remote identification system of claim 1, in which the first characters in the SSID are used as a flag or header; a second set of characters in the SSID are used for latitude and longitude data; and a third set of characters in the SSID are used for altitude data.

16. The remote identification system of claim 1, in which course, heading and speed are added to Vendor Specific Information.

17. The remote identification system of claim 1, in which the broadcast data includes a conventional, static identifier, that includes a network name, or device identifier, or MAC address.

18. The remote identification system of claim 1, in which the wireless transmitter is a 802.11 WiFi transmitter or a Bluetooth transmitter.

19. A system for establishing a wireless mesh network among multiple unmanned aerial vehicles (UAVs), wherein each UAV includes a local broadcast device including a wireless transmitter configured to broadcast a static identifier, and in which the local broadcast device is configured to (i) broadcast data and (ii) to dynamically alter or re-purpose frames of the static identifier so that it is no longer a static identifier but instead includes data that varies depending on a status of the UAV; and (iii) to include these frames in the broadcast data;

the local broadcast device further including a receiver configured to scan for available wireless connections broadcast by other UAVs equipped with similar local broadcast devices, thereby establishing a wireless mesh network among the UAVs.

20. A remote identification method for the remote identification of a unmanned aerial vehicle (UAV), wherein the UAV includes a local broadcast device including a wireless transmitter configured to broadcast a static identifier, and in which the local broadcast device is configured to (i) broadcast data and (ii) to dynamically alter or re-purpose frames of the static identifier so that it is no longer a static identifier but instead includes data that varies depending on a status of the UAV; and (iii) to include these frames in the broadcast data;

the local broadcast device further including a receiver configured to scan for available wireless connections broadcast by other UAVs equipped with similar local broadcast devices, thereby establishing a wireless mesh network among the UAVs.

21. The remote identification system of claim 1, wherein the local broadcast device is further configured to retransmit received wireless signals from the other UAVs to extend communication range within the mesh network.

* * * * *